United States Patent [19]

McGrath, Jr.

[11] 3,999,777
[45] Dec. 28, 1976

[54] BICYCLE TRAILER
[76] Inventor: Patrick Joseph McGrath, Jr., Rte. 3, Box 210, Cornelius, Oreg. 97113
[22] Filed: June 20, 1975
[21] Appl. No.: 588,963

Related U.S. Application Data

[63] Continuation-in-part of Ser. No. 356,638, May 11, 1973, abandoned.

[52] U.S. Cl. .................. 280/204; 280/292
[51] Int. Cl.² ...................... B62K 27/10
[58] Field of Search .......... 280/204, 480, 292, 457

[56] References Cited

UNITED STATES PATENTS

| | | | |
|---|---|---|---|
| 653,415 | 7/1900 | Ford | 280/204 |
| 660,598 | 10/1900 | Stonebridge | 280/204 |
| 706,934 | 8/1902 | Harris | 280/63 |
| 2,770,470 | 11/1956 | Halverson | 280/414 R |
| 3,100,120 | 8/1963 | Cleary | 280/204 |
| 3,542,391 | 11/1970 | O'Hara | 280/282 |
| 3,734,536 | 5/1973 | Dever | 280/204 |
| 3,747,955 | 7/1973 | MacAlpine | 280/204 |
| 3,787,065 | 1/1974 | Grimm | 280/204 |
| 3,792,875 | 2/1974 | Paden | 280/204 |

FOREIGN PATENTS OR APPLICATIONS

| | | | |
|---|---|---|---|
| 579,496 | 8/1946 | United Kingdom | 280/204 |

Primary Examiner—M. H. Wood, Jr.
Assistant Examiner—Jack D. Rubenstein

[57] ABSTRACT

A bicycle trailer comprises axle means having wheel means mounted on each end. A post member is latchably secured at one location to the axle means and at another location it is pivotally mounted to a hitching member which is to be secured onto a bicycle frame. Supporting members extend outwardly from the post member onto which container means are secured.

4 Claims, 15 Drawing Figures

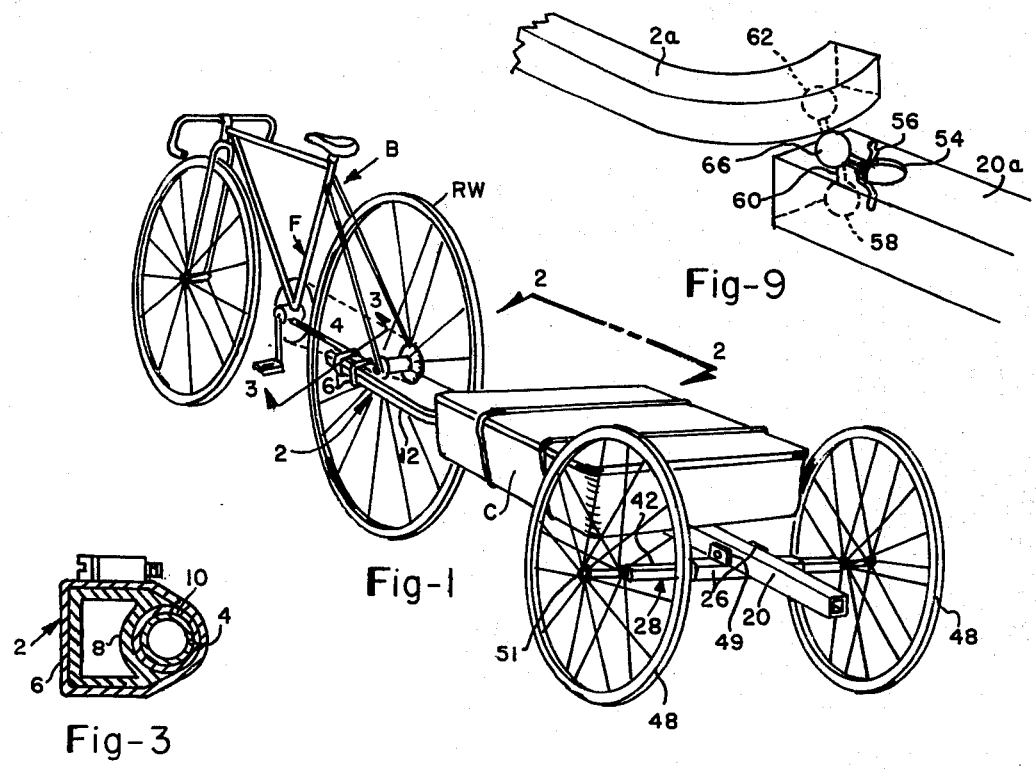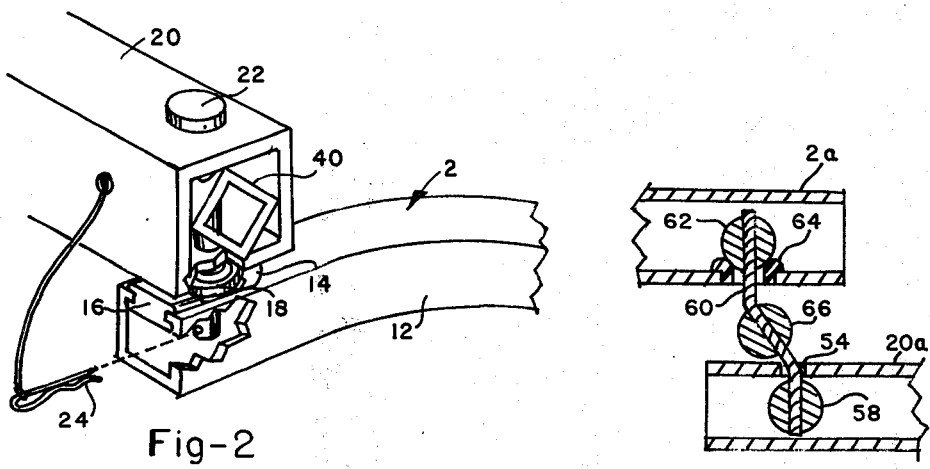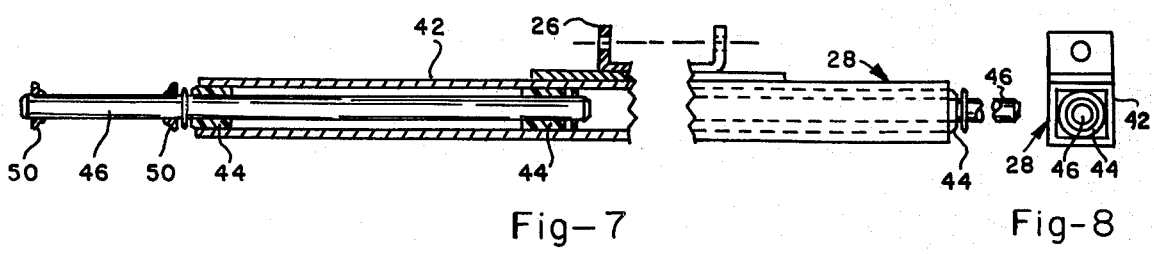

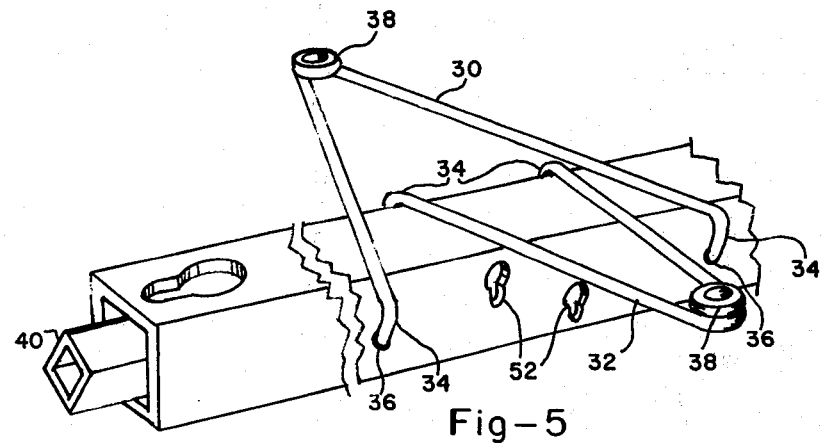
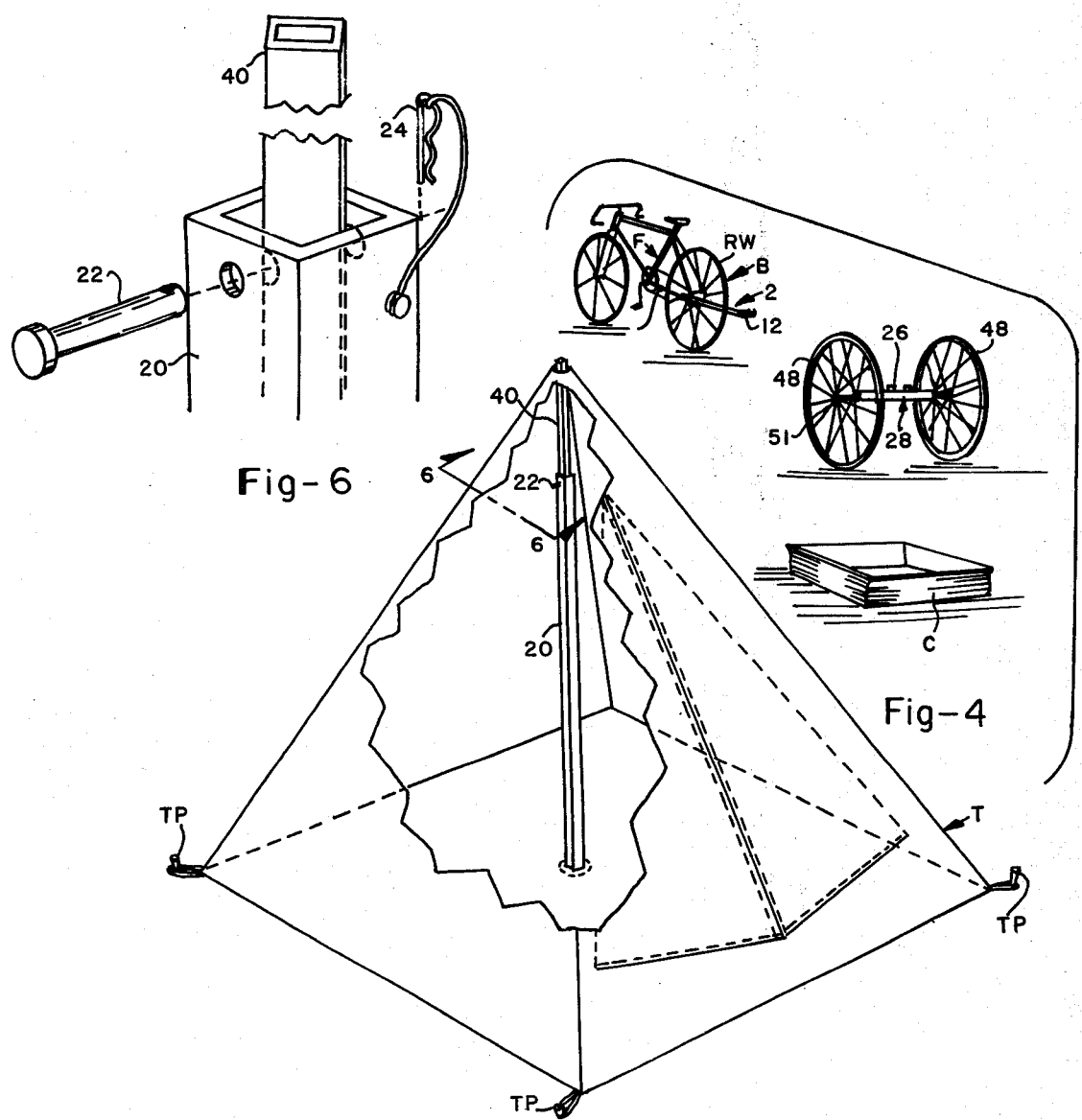

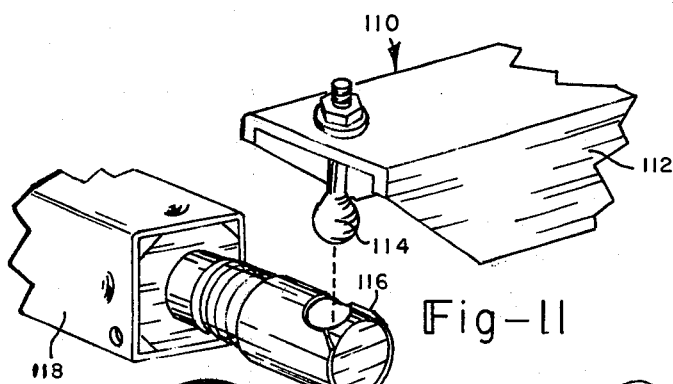
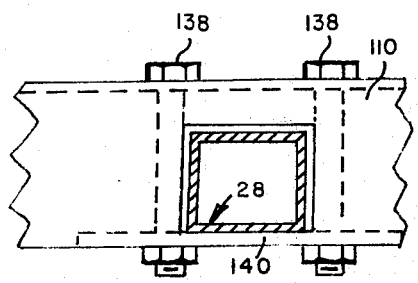
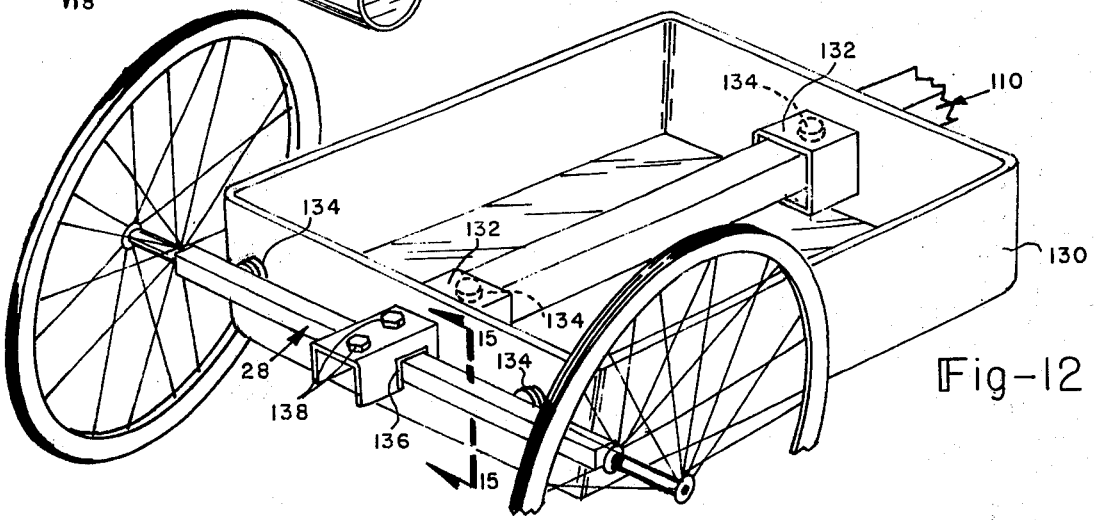
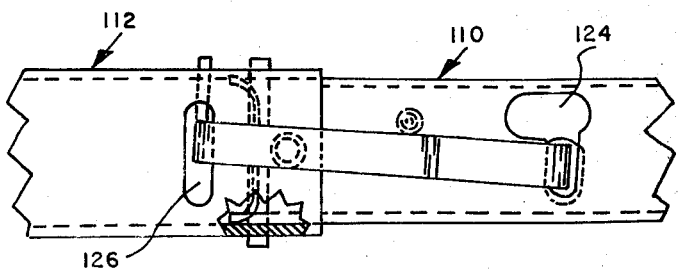
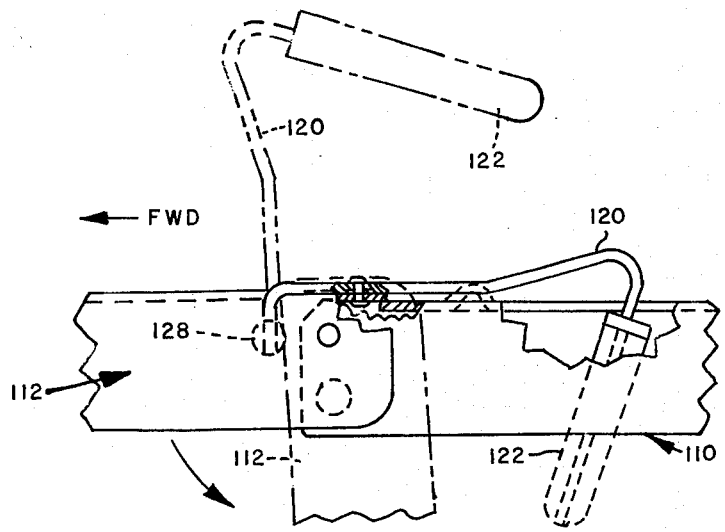

BICYCLE TRAILER

CROSS REFERENCE TO RELATED APPLICATION

This application is a continuation-in-part application of Ser. No. 356,638, filed May 11, 1973, now abandoned.

BACKGROUND OF THE INVENTION

Bicycle usage is increasing and the bicycle is being used for long trips including camping. One way to carry camping equipment is in a knapsack strapped onto the rider's back or a "saddle bag" attached to a bicycle, but this is burdensome and unstable. Another existing way is by use of a trailer that is two-wheeled and has an arcuate-shaped mounting member which is pivotally connected via a wishbone yoke method to the bicycle frame under the seat. This kind of trailer is heavy in comparison, where weight is a critical factor.

SUMMARY OF THE INVENTION

The present invention relates to trailers and more particularly to bicycle trailers. The trailer is lightweight and it is provided with an axle having wheels at each end. A post is releasably secured onto the axle and it is provided with diametrical mounting members for securing thereto container means. The front end of the post is pivotally secured to a hitching member which is secured onto the bicycle frame.

An object of the present invention is to provide a bicycle trailer that is lightweight but of rugged construction.

Another object of the present invention is the provision of a bicycle trailer that is provided with a post which is latchably secured onto an axle for the wheels.

A further object of the invention is to provide a bicycle trailer that can be easily connected to a bicycle.

An additional object of the invention is the provision of a bicycle trailer that is stable in operation.

A still further object of the invention is to provide mounting means on the post to which container means can readily be secured.

Yet another object of the invention is to provide an inexpensive light load bearing design of low cost to replace the conventional ball bearing.

Still an additional object of the invention is a bicycle trailer that is economical to manufacture and which is versatile.

Still a further object of the invention is to provide a latching means to latch the trailer to the bicycle.

BRIEF DESCRIPTION OF THE DRAWING

The foregoing and other objects of the invention will become apparent from the detailed description and the accompanying drawings (2 sheets) of which:

FIG. 1 is a perspective view of the trailer connected to a bicycle;

FIG. 2 is a view taken along lines 2—2 of FIG. 1 with parts broken away;

FIG. 3 is a view taken along line 3—3 of FIG. 1;

FIG. 4 is a perspective view showing the parts of FIG. 1 in exploded positions;

FIG. 5 is a part perspective view of mounting means on the post;

FIG. 6 is a view taken along line 6—6 of FIG. 4;

FIG. 7 is a side elevational view (partly in cross section) of the axle;

FIG. 8 is an end view of FIG. 7;

FIG. 9 is a view similar to FIG. 2 of an alternative latching means;

FIG. 10 is a cross-sectional view of FIG. 9.

FIG. 11 is a part perspective view of an alternative embodiment of latching means;

FIG. 12 is a perspective view of an alternative trailer;

FIG. 13 is a top plan view of part of the post means;

FIG. 14 is a side elevational view of FIG. 13; and

FIG. 15 is a cross-sectional view of the axle-mounting means.

DETAILED DESCRIPTION OF PREFERRED EMBODIMENT

Turning to the drawing, a bicycle B is shown which has a hitching member 2 secured to a horizontal member 4 of the bicycle frame F via clamps 6. Hitching member 2 is tubular and has an indented area 8 for securing onto horizontal member 4 and a split plastic sleeve 10 is mounted onto horizontal member 4 where indented area 8 of hitching member 2 is mounted on horizontal member 4 via clamps 6. The indented area 8 and sleeve 10 prevent hitching member 2 from slipping relative to horizontal member 4 and sleeve 10 protects horizontal member 4 from being scratched.

The hitching member 2 is provided with an arcuate section 12 so that the back end is positioned adjacent to the back of the rear wheel RW of bicycle B. A slot 14 is provided in member 2 and it has a plastic member 16 secured in slot 14 via the opposing legs of the slot 14 frictionally disposed in channels of plastic member 16 and clinched in position within slot 14. A spherical bearing 18 is secured in member 16.

A tubular post member 20 is pivotally connected at one end via pin 22 to spherical bearing 18 and pin 22 is secured in position by securing pin 24. Spherical bearing 18 enables post member 20 to move freely about a vertical axis through member 2 and to a limited degree about two perpendicular axis' in the horizontal plane of member 2. Brackets 26 releasably secure post member 20 to axle 28. Mounting members 30, 32 are provided with arcuate ends 34 which extend through holes 36 in opposite sides of tubular post member 20, and, due to the fact that mounting members 30, 32 are made of spring steel or the like, they will be maintained in position as illustrated in FIG. 5 with mounting member 32 disposed inside mounting member 30 and the apex of mounting member 30 is disposed opposite the apex of mounting member 32, however they are in the same horizontal and vertical planes. Fastener elements 38 are provided in each apex of mounting members 30, 32. Further mounting provision is facilitated by keyhole openings 52 in post member 20 as illustrated in FIG. 5.

A container C with a covering secured thereon is disposed on mounting members 30, 32 and secured thereto via fasteners, not shown, mated with fastener elements 38 as illustrated in FIG. 1. The container can take any form and may be a wire basket, not shown, attached to fastener elements 38.

A smaller tubular member 40 can be telescopically disposed within tubular post member 20, and it can be secured therein via pin 22 extending through a hole in member 40 as well as being moved to selected positions and secured thereat via pin 22 mating with holes in member 40. With member 40 moved to a selected position relative to member 20 as illustraed in FIG. 4 after member 20 has been removed from axle 28, there members form a center support for a tent T, of pyramid or other configuration, whereby member 20 is disposed in a reinforced post-receiving area centrally secured in the tent floor and member 40 is received in the topmost part of the tent to maintain the tent in position vertically whereas tent posts TP position the corners of the tent. Tent T can be readily assembled from a folded position in container C which can also carry other essential camping supplies therein. Mounting members 30, 32 can be removed from member 20 when used as a tent post.

Axle 28 includes a tubular member 42 which has spaced annular plastic members 44 having rod 46 therein frictionally secured therein. Wheels 48 are secured on molded plastic bearings 50, the bearings conforming on one side to the internal shape of the wheel hub 51 and being mounted on rod 46 thereby providing stability to the trailer. There bearings also facilitate the wheels to be assembled onto the axle with less effort and provide less shock when moving along rough surfaces.

Brackets 26 have a U-shaped area secured on tubular member 42, and member 42 enables brackets 26 to be readily secured thereto. Opposed upwardly-directed projections of brackets 26 which are spaced enough to enable member 20 to be received therebetween serve to latchably secure member 20 to axle 28 via a pin 49 and securing pin identical to pin 24.

As can be discerned, container C is best secured forward of wheels 48 on member 20 to render the trailer more stable. Mounting means can be provided on axle 28 if desired as well as member 20 to accommodate a larger container.

FIGS. 8 and 9 illustrate an alternative latching means. Post member 20a is provided with a keyhole slot 54, and a wire member 56 has its ends secured in post member 20a on each side of keyhole slot 54 while the intermediate part of wire member 56 extends into the large section of keyhole slot 54 to maintain a spherical member 58 in position in slot 54. Spherical member 58 is secured onto one end of cable 60 while another spherical member 62 is secured onto the other end of cable 60 which rides in grommet 64 secured in hitching member 2a.

Cable 60 and its spherical members 58 and 67 define a latching means that enables post member 20a to move freely relative to hitching member 2a and spherical member 66 disposed onto cable 60 between post member 20a and hitching member 2a enables post member 20a to readily pivot about hitching member 2a and keeps them properly separated from each other.

FIGS. 11–15 illustrate a further embodiment of the trailer which includes U-shaped post 110 which has a pivotable leg 112 that can be positioned for engagement via ball pivot 114 with ball socket swivel 116 secured to hitching member 118 as shown in FIG. 11. Hitching member 118 is secured to the lower frame member of the bicycle in the same manner as shown by FIG. 11. Leg 112 can also be moved to a right angle position as illustrated in FIG. 14 for resting the trailer thereon.

A handle 120 is pivotally mounted onto leg 112 and it has a handle section 122 that passes through an enlarged section of hole 124 in post 110 and by pivoting handle 120 handle section 122 moves into a small section of hole 124, as shown in FIG. 13, to provide a safety lock. The front end of handle 120 has a section that extends through oblong hole 126 in leg 112 and through a hole 128. When handle 120 is pivoted so that handle section 122 is in alignment with the enlarged section of hole 124, the leg 112 and handle 120 thereon are moved to a down position and handle section 122 is positioned in an up position, as shown in broken lines in FIG. 14. With the handle in its up position, this enables a person to grasp the handle section and move the trailer.

FIG. 12 shows the container 130 which is molded from a suitable plastic material such as high density polyethylene and it contains rectangular-shaped sections 132 having openings therein and through which post 110 extends having securing means 134, preferably in the form of fasteners manufactured by 3M Company under the trademark HEDLOK which are used to fasten post 110 and sections 132 together. Axle 28, as shown in FIGS. 7 and 8, is centrally positioned in slots 136 in post 110 and rubber is wrapped around axle 28 to prevent metal-to-metal contact and operates as a shock absorber. Bolts 138 and a plate 140 secure post 110 and axle 28 together.

Thus, there has been disclosed a light and economical trailer for a bicycle that is rugged and easily assembled and which can easily be secured to existing bicycles. Although the preferred embodiment of the invention has been herein described, it will be obvious to those skilled in the art that various modifications may be made in the details of the invention without departing from the principle herein set forth.

The invention is claimed in accordance with the following: 1.

1. A trailer adapted to be towed behind a two-wheel cycle, said cycle having a lower frame member extending along the rear wheel substantially parallel to a surface along which the two-wheel cycle moves, said trailer comprising:
    hitching means having one section for extending along the lower frame member including securing means for securing said hitching means to the lower frame member, said hitching means including a section defining a back end so that said back end is positioned adjacent the periphery of the rear wheel;
    post means having one end for pivotal connection to said back end;
    axle means having bearing means for securing wheel means to each end thereof;
    bracket means between said axle means and said post means securing said post means and said axle means together;
    mounting means provided by said post means for securing container means thereon;
    latching means pivotally securing said one end of said post means to said back end of said hitching means whereby said post means extends in the same direction with the front and rear wheels of the cycle during normal operation thereof; and
    leg means provided by said post means pivotally connected to the hitching end thereof including handle means to latch said post means and leg means in a hitching position and said handle means and leg means are adapted to be moved to a substantially right angle position when said handle means unlatches said leg means and said post means.

2. A bicycle trailer according to claim 1 wherein said one end of said hitching means has an indented area.

3. A bicycle trailer according to claim 1 wherein said bearings conform to the wheel internal hub shape and are disposed to be retained therein.

4. A bicycle trailer according to claim 1 wherein said container has rectangular-shaped openings through which said post means extends and said mounting means are provided by said post means and said rectangular-shaped openings for securing said post means and said container together.

* * * * *